(12) United States Patent
Jeong

(10) Patent No.: US 8,711,031 B2
(45) Date of Patent: Apr. 29, 2014

(54) APPARATUS AND SENSOR FOR ADJUSTING VERTICAL SENSOR-ALIGNMENT

(75) Inventor: Seong Hee Jeong, Seoul (KR)

(73) Assignee: Mando Corporation, Gyeonggi-do (KR)

( * ) Notice: Subject to any disclaimer, the term of this patent is extended or adjusted under 35 U.S.C. 154(b) by 456 days.

(21) Appl. No.: 12/949,393

(22) Filed: Nov. 18, 2010

(65) Prior Publication Data

US 2011/0156955 A1 Jun. 30, 2011

(30) Foreign Application Priority Data

Dec. 31, 2009 (KR) ........................ 10-2009-0135472

(51) Int. Cl.
*G01S 13/00* (2006.01)
*G01S 13/93* (2006.01)
*G01S 13/34* (2006.01)
*G01S 13/66* (2006.01)
*G01S 13/68* (2006.01)

(52) U.S. Cl.
CPC .............. *G01S 13/931* (2013.01); *G01S 13/34* (2013.01); *G01S 13/345* (2013.01); *G01S 13/66* (2013.01); *G01S 13/68* (2013.01)
USPC ............................................. 342/70; 342/75

(58) Field of Classification Search
CPC .................................................... G01S 13/931
USPC ....................................................... 342/70, 75
See application file for complete search history.

(56) References Cited

U.S. PATENT DOCUMENTS

| | | | | |
|---|---|---|---|---|
| 5,008,678 A | * | 4/1991 | Herman | 342/158 |
| 6,026,353 A | * | 2/2000 | Winner | 702/183 |
| 6,288,672 B1 | * | 9/2001 | Asano et al. | 342/374 |
| 6,896,082 B2 | * | 5/2005 | Asanuma et al. | 180/169 |
| 6,907,269 B2 | * | 6/2005 | Yamaguchi et al. | 455/561 |
| 6,933,883 B2 | * | 8/2005 | Isaji | 342/174 |
| 7,221,310 B2 | * | 5/2007 | Nakagawa | 342/174 |
| 2004/0080450 A1 | * | 4/2004 | Cheong | 342/118 |
| 2004/0117090 A1 | * | 6/2004 | Samukawa et al. | 701/45 |
| 2005/0116854 A1 | * | 6/2005 | Beez et al. | 342/70 |
| 2006/0267764 A1 | * | 11/2006 | Morinaga et al. | 340/545.3 |

* cited by examiner

*Primary Examiner* — Frank J McGue
(74) *Attorney, Agent, or Firm* — McDermott Will & Emery LLP

(57) ABSTRACT

Disclosed are a sensor, the vertical alignment of which can be adjusted, and a vertical sensor-alignment adjustment apparatus using the same. In particular, in order to allow the vertical alignment to be adjusted, the sensor has a construction including a plurality of switchable transmitting antennas or a plurality of switchable receiving antennas or a construction including a tilting motor for adjusting an transmitting angle or a receiving angle. The vertical sensor-alignment adjustment apparatus employing such a sensor determines whether the sensor is misaligned in terms of its vertical alignment, and corrects the vertical misalignment of the sensor by executing variable switching to one of the transmitting antennas, by executing variable switching to one of the receiving antennas, or by controlling the tilting motor, so that the transmitting angle of sensor signals or the receiving angle of reflected waves for the sensor signals can be adjusted.

2 Claims, 12 Drawing Sheets

FIG. 2
(a)
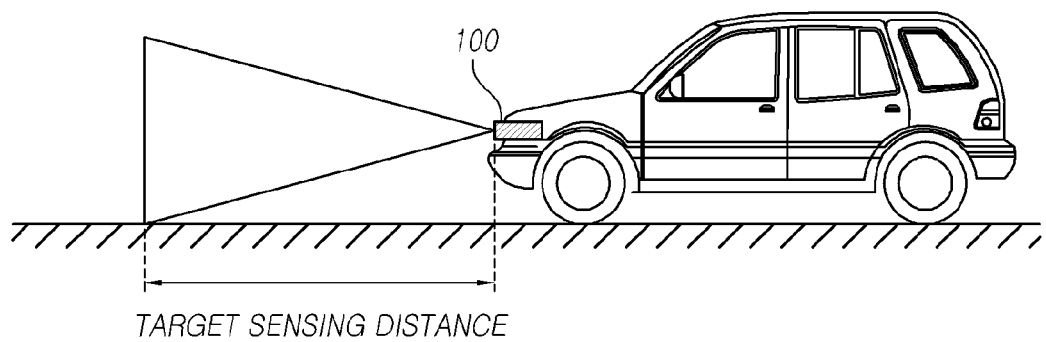
TARGET SENSING DISTANCE
(b)
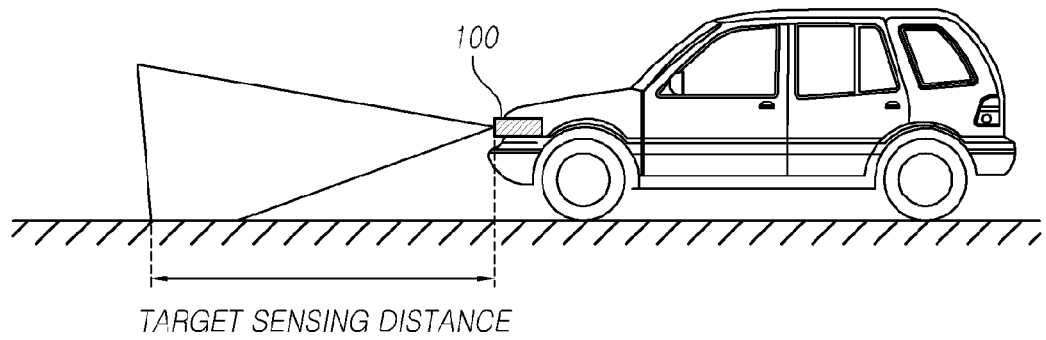
TARGET SENSING DISTANCE

FIG. 3
(a)
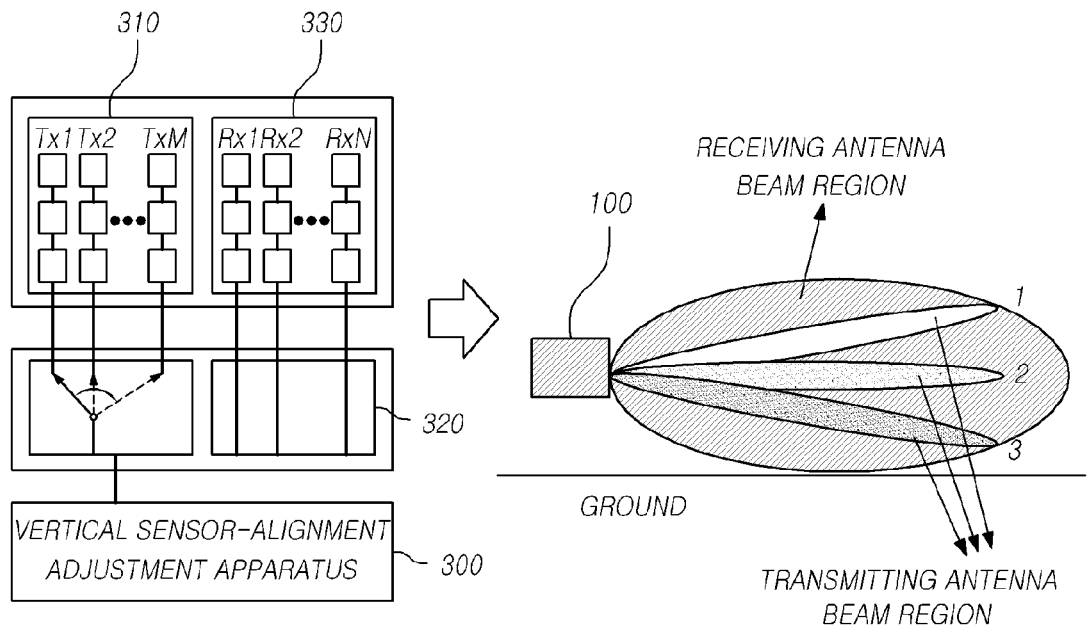
(b)
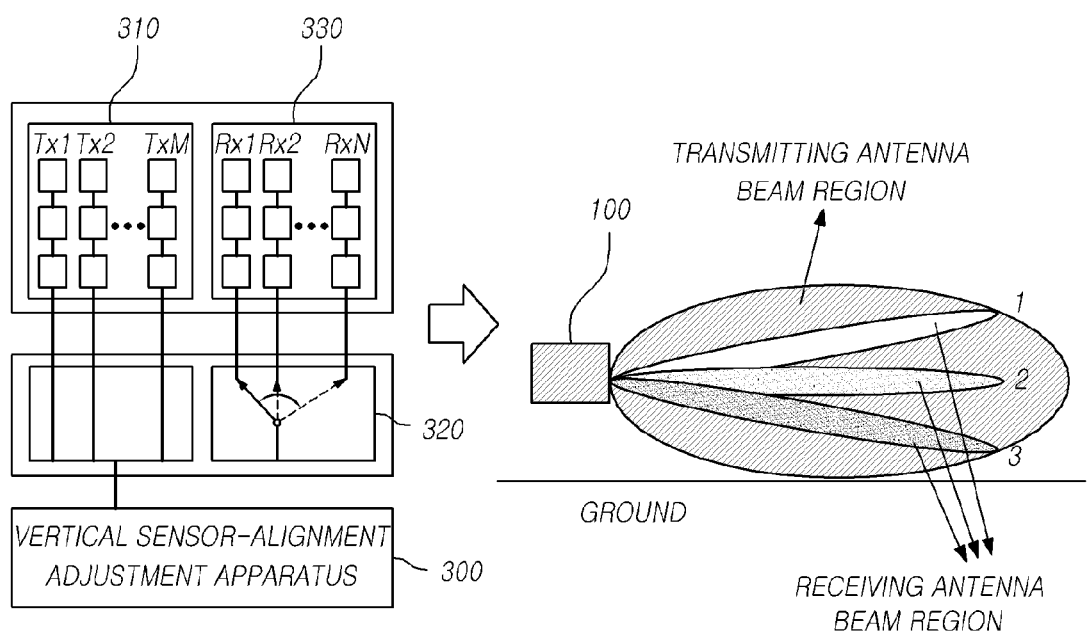

FIG. 10
(a)
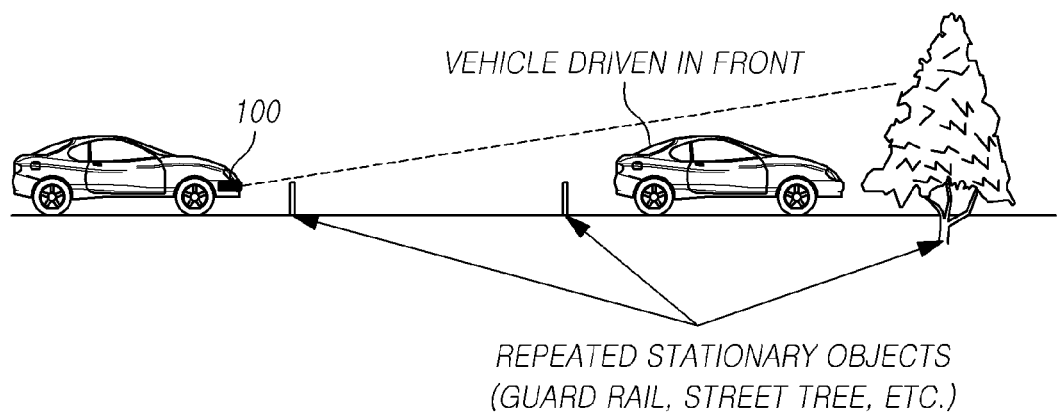
(b)
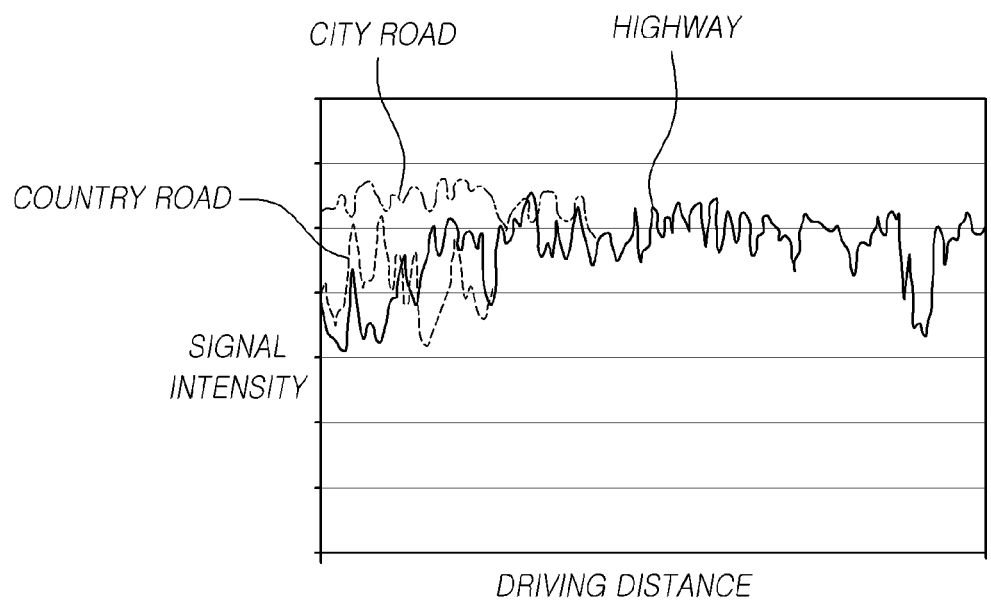

APPARATUS AND SENSOR FOR ADJUSTING VERTICAL SENSOR-ALIGNMENT

CROSS-REFERENCE TO RELATED APPLICATION

This application claims priority from and the benefit of Korean Patent Application No. 10-2009-0135472, filed on Dec. 31, 2009, which is hereby incorporated by reference for all purposes as if fully set forth herein.

BACKGROUND OF THE INVENTION

1. Field of the Invention

The present invention relates to an apparatus and a sensor for adjusting vertical sensor-alignment. More particularly, the present invention relates to a technique for adjusting vertical sensor-alignment by sensing the misalignment of a sensor mounted on a vehicle when the sensor is vertically misaligned.

2. Description of the Prior Art

Recently, according to the development of intelligent techniques for vehicles, intelligent techniques, such as an ACC (Adaptive Cruise Control) system and a stop and go system for following behind another vehicle, a BSD (Blind Spot Detection) system for detecting a blind spot of a vehicle, an LCA (Lane Change Assist) system for assisting safe lane change, and a pre-crash system (a collision avoidance system) for preventing a vehicle from coming into collision with a vehicle being driven in front, have been applied to a vehicle. In order to accomplish the essential functions, the intelligent techniques require sensors, such as a radar sensor, and an ultrasonic sensor, and the functions can be correctly performed only when correct information can be acquired through these sensors.

However, a sensor mounted on a vehicle may suffer from positional change or directional distortion due to a collision accident, superannuation or the like of the vehicle. Given such a condition, problems may be caused in performing the functions of the various systems using such a sensor since the precision of information acquired from the sensor is deteriorated. Therefore, if a sensor mounted on a vehicle suffered from a positional change or directional distortion due to the collision accident, superannuation or the like of the vehicle, it is necessary to adjust the alignment of the sensor in terms of horizontal and vertical planes. In the case of a radar sensor, although the horizontal alignment of the sensor in a vehicle may be automatically processed by software, it is practically impossible to automatically adjust the vertical alignment of such a sensor. Due to this, there is an inconvenience that it is necessary for the vehicle to be subjected to a service for adjusting the vertical alignment of a radar sensor each time when it is require to adjust the vertical alignment.

SUMMARY OF THE INVENTION

Accordingly, the present invention has been made to solve the above-mentioned problems occurring in the prior art, and an object of the present invention is to provide a technique for automatically adjusting the vertical alignment of a sensor mounted on a vehicle by sensing the positional change or directional distortion of the sensor when the sensor suffered from a positional change or directional distortion due to a contact accident, bumper collision, superannuation or the like of the vehicle.

Another object of the present invention is to provide a technique for automatically adjusting the vertical alignment of a sensor mounted on a vehicle by determining whether it is required to adjust the vertical sensor-alignment or not, so that systems employing such a sensor can correctly perform the functions thereof, and eventually a driver can safely drive the vehicle.

In order to accomplish this object, there is provided an apparatus for adjusting vertical sensor-alignment including: a ground-reflected wave measuring unit for measuring the signal intensity of ground-reflected waves on the basis of received reflected waves for sensor signals transmitted from the sensor; a target sensing distance measuring unit for measuring the longest target-sensible distance as a target sensing distance on the basis of the received reflected waves; a vertical misalignment determining unit which determines that the sensor is vertically misaligned when the signal intensity of the ground-reflected waves measured by the ground-reflected wave measuring unit exceeds a reference signal intensity, and the measured target sensing distance is reduced beyond a reference target sensing distance; and a vertical alignment adjustment unit for correcting the vertical misalignment of the sensor by controlling a tilting motor, by executing switching to one of a plurality of transmitting antennas which are differently set in terms of transmitting angle, or by executing switching to one of a plurality of receiving antennas which are differently set in terms of receiving angle.

In accordance with another aspect of the present invention, there is provided an apparatus for adjusting vertical sensor-alignment including: a reflected wave measuring unit for measuring the signal intensity of received reflected waves for sensor signals transmitted from a sensor; a vertical misalignment determining unit which determines that the sensor is vertically misaligned if the measured signal intensity of the reflected waves is lower than a reference signal intensity; and a vertical alignment adjustment unit for correcting the vertical misalignment of the sensor by controlling a tilting motor, by executing switching to one of a plurality of transmitting antennas which are differently set in terms of transmitting angle, or by executing switching to one of a plurality of receiving antennas which are differently set in terms of receiving angle.

In accordance with another aspect of the present invention, there is provided an apparatus for adjusting vertical sensor-alignment including: a vertical inclination measuring unit for measuring the vertical inclination of a sensor with reference to a ground with an acceleration sensor; a vertical misalignment determining unit which determines that the sensor is vertically misaligned when the difference between the measured vertical inclination of the sensor and the vertical inclination of the ground is positioned out of a predetermined range; and a vertical alignment adjustment unit which corrects the vertical misalignment of the sensor when it is determined that the difference between the measured vertical inclination of the sensor and the vertical inclination of the ground is positioned out of the predetermined range, by controlling a tilting motor, by executing switching to one of the transmitting antennas which are differently set in terms of transmitting angle, or by executes switching to one of the receiving antennas which are differently set in terms of receiving angle, so that the difference between the measured vertical inclination of the sensor and the vertical inclination of the ground is positioned within the predetermined range.

In accordance with another aspect of the present invention, there is provided a sensor including: a plurality of transmitting antennas which are differently set in terms of transmitting angle for transmitting sensor signals; a switch for selecting a transmitting antenna set to an transmitting angle most adjacent to a desired transmitting angle among the transmitting antennas, so that the sensor signals can be transmitted at the desired transmitting angle; and a plurality of receiving antennas for receiving reflected waves for the sensor signals transmitted through the transmitting antenna selected by the switch.

Finally, in accordance with another aspect of the present invention, there is provided a sensor including: a plurality of transmitting antennas for transmitting sensor signals; a plurality of receiving antennas which are differently set in terms of receiving angle; and a switch for selecting a receiving antenna set to a receiving angle corresponding to a predetermined transmitting angle for the sensor signals among the receiving antennas, so that the reflected waves for the sensor signals transmitted at the predetermined transmitting angle from one of the transmitting antennas can be received by the selected receiving antenna.

As described above, according to the present invention, it is possible to automatically adjust the vertical alignment of a sensor mounted on a vehicle by sensing the positional change or directional distortion of the sensor when the sensor suffered from a positional change or directional distortion due to a contact accident, bumper collision, superannuation or the like of the vehicle.

In addition, according to the present invention, it is possible to automatically adjust the vertical alignment of a sensor mounted on a vehicle by determining whether it is required to adjust the vertical alignment, so that systems employing such a sensor can correctly perform the functions thereof, and eventually a driver can safely drive the vehicle.

BRIEF DESCRIPTION OF THE DRAWINGS

The above and other objects, features and advantages of the present invention will be more apparent from the following detailed description taken in conjunction with the accompanying drawings, in which:

FIGS. 2a and 2b show a sensor signal transmitted at the time of vertical correct alignment of the inventive sensor, and a sensor signal transmitted at the time of vertical incorrect alignment (misalignment) of the inventive sensor, respectively;

FIGS. 3a and 3b show sensors with a vertical alignment adjustment function according to an antenna switching method in accordance with an embodiment of the present embodiment;

FIGS. 10a and 10b show a method of measuring ground-reflected waves with an apparatus for adjusting vertical sensor-alignment in accordance with another embodiment of the present invention;

DETAILED DESCRIPTION OF THE PREFERRED EMBODIMENTS

Figure 1:
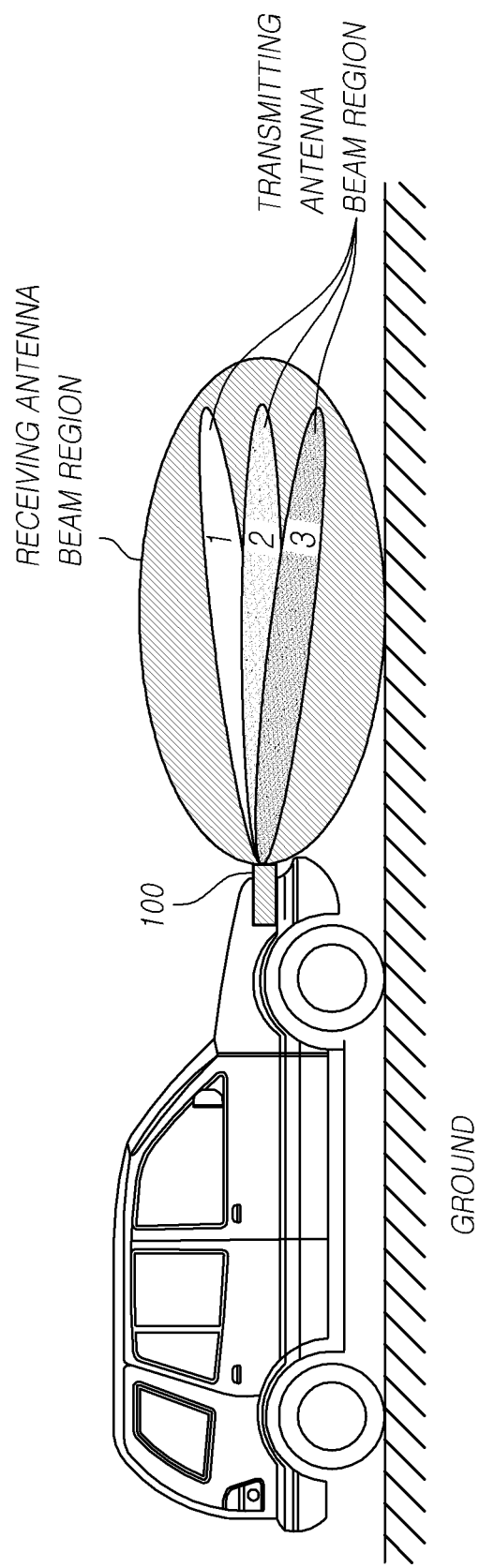
FIG. 1 shows beam regions of receiving and transmitting antennas for a sensor in accordance with the present invention.

Hereinafter, a preferred embodiment of the present invention will be described with reference to the accompanying drawings. In the following description and drawings, it shall be noted that the same reference numerals are used to designate the same or similar components, and so repetition of the description on the same or similar components will be omitted. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 shows beam regions of a receiving antenna and a transmitting antenna for a sensor 100 in accordance with the present invention.

The inventive sensor 100 performs a sensor function by transmitting sensor signals through at least one transmitting antenna, and receiving, through a receiving antenna, reflected waves for the transmitted sensor signals reflected by an object, ground or the like, wherein the vertical alignment of the sensor 100 should be correctly adjusted in order for the sensor 100 to correctly perform its sensor function.

Referring to FIG. 1, by adjusting the vertical alignment, the inventive sensor 100 can transmit sensor signals to various regions, including a transmitting antenna beam region of number 1, a transmitting antenna beam region of number 2, and a transmitting antenna beam region of number 3, through at least one transmitting antenna, and can receive reflected waves for the transmitted sensor signals, which are reflected to a receiving antenna beam region as shown in FIG. 1.

As shown in FIG. 1, it is possible to control the inventive sensor 100 in such a manner that the sensor signals are transmitted to one region among various regions, including the number 1 transmitting antenna beam region, the number 2 transmitting antenna beam region, and the number 3 transmitting antenna beam region. In particular, if the sensor 100 suffered from change or distortion in mounted position or direction to such an extent that the sensor 100 is directed to or away from the ground, and hence the sensor 100 is vertically misaligned, sensor signals may be transmitted to the number 3 transmitting antenna beam region or the number 1 transmitting antenna beam region through the transmitting antenna of the sensor 100, and in such a vertically misaligned state, the sensor 100 can be controlled to transmit sensor signals to the number 2 transmitting antenna beam region, so that the sensor can perform a vertical alignment adjustment function for correcting the vertical misalignment.

Although FIG. 1 shows that the vertical alignment of the sensor 100 is adjusted by selecting one transmitting antenna among various transmitting antennas, thereby adjusting the transmitting angle of sensor signals, it is also possible to adjust the vertical alignment of the sensor 100 by selecting one receiving antenna among various receiving antennas, thereby adjusting the receiving angle of the reflected waves for the sensor signals.

When the sensor 100 is vertically misaligned, a target sensing distance, which is the longest distance allowed for sensing a target, may be abruptly reduced or increased. For example, referring to FIGS. 2a and 2b, it can be noted that the target sensing distance in FIG. 2b at the time when the sensor 100 is caused to be incorrectly adjusted in terms of vertical alignment so that the sensor 100 is directed toward the ground, is reduced as compared to the target sensing distance in FIG. 2a at the time when the sensor 100 is correctly adjusted in terms of vertical alignment.

The adjustment function of the vertical alignment of the sensor 100 may generally include a function of determining whether the sensor 100 is vertically misaligned or not, and a function of correcting the vertical misalignment.

Figure 11:
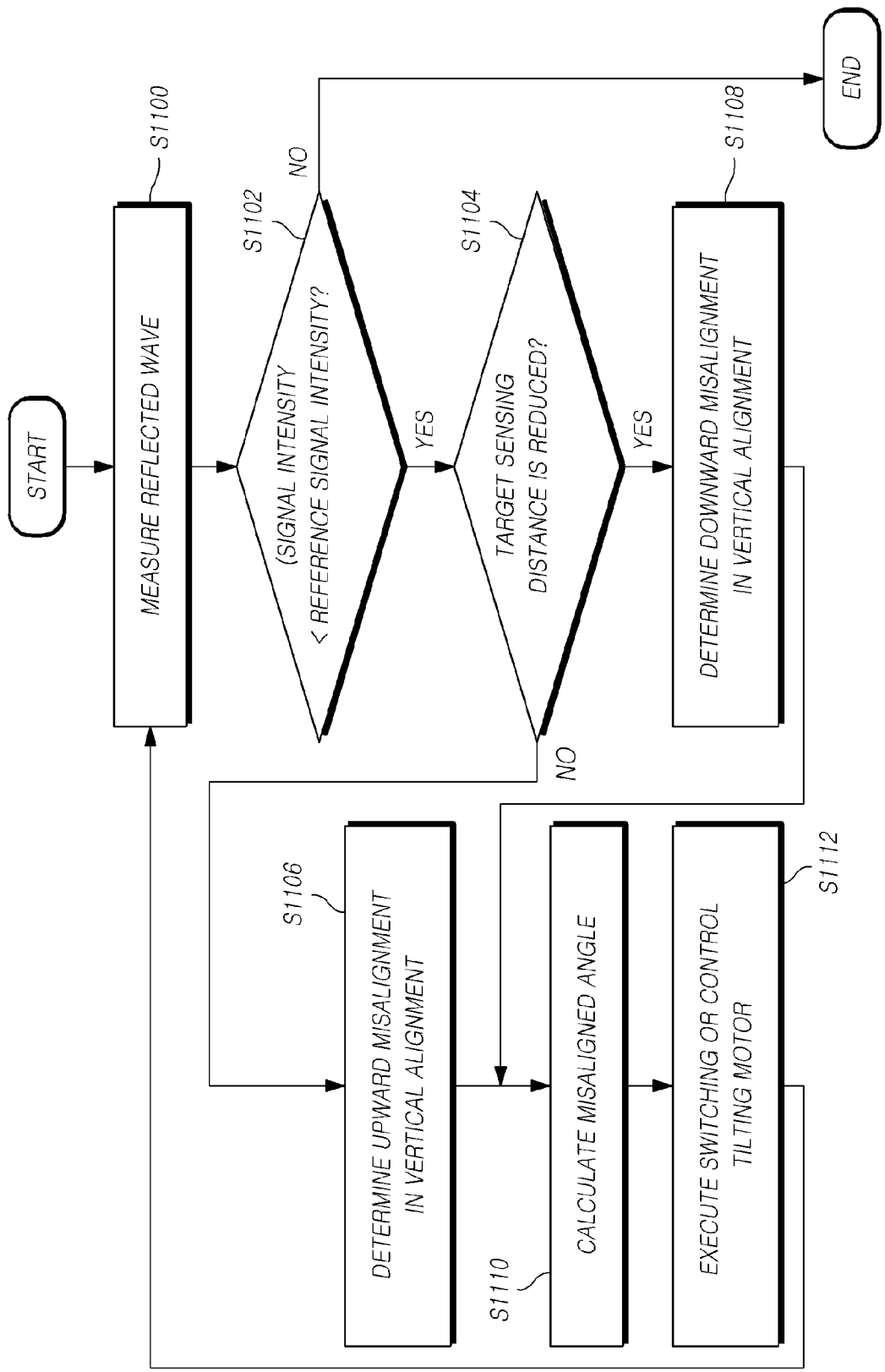
FIG. 11 is a flowchart for a method of adjusting vertical sensor-alignment in accordance with another embodiment of the present invention.
Figure 12:
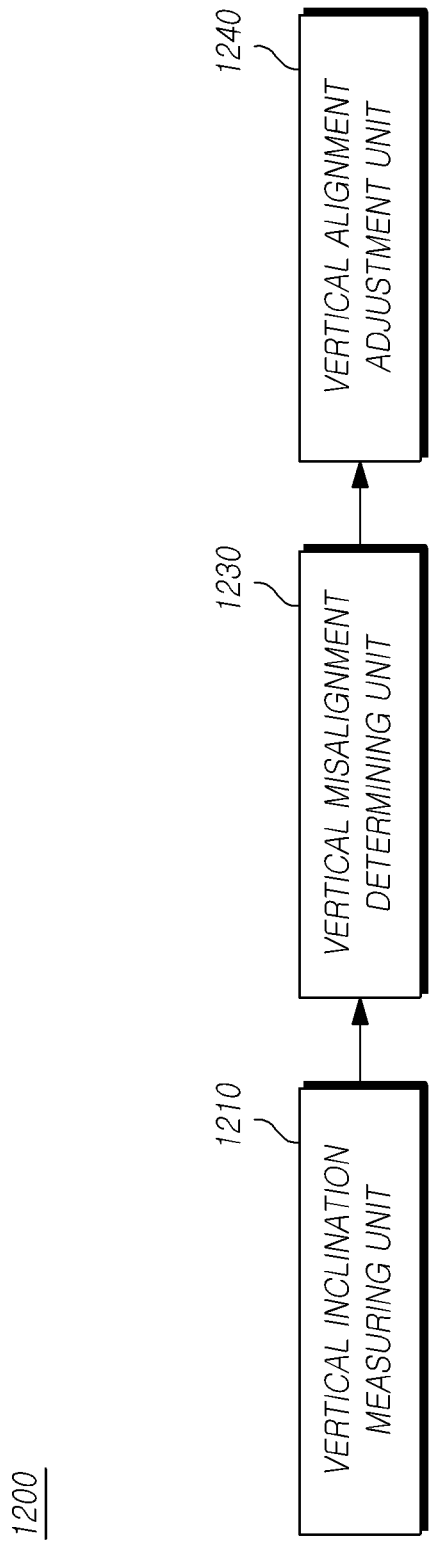
FIG. 12 is a block diagram for an apparatus for adjusting vertical sensor-alignment in accordance with another embodiment of the present invention.

A method of determining whether the sensor 100 is vertically misaligned may be executed by using one of a method of measuring the signal intensity of ground-reflected waves for transmitted sensor signals reflected by the ground (see FIGS. 6 to 8), a method of measuring the signal intensity of reflected waves for transmitted sensor signals reflected by an object (see FIGS. 9 to 11), and a method of measuring the vertical inclination of the sensor 100 (see FIG. 12). Here, the ground-reflected waves, the reflected waves, and the vertical inclination are information items for the vertical posture of the sensor 100. In addition, whether the target sensing distance is changed or not may be also considered together in determining the vertical misalignment of the sensor 100.

Figure 4:
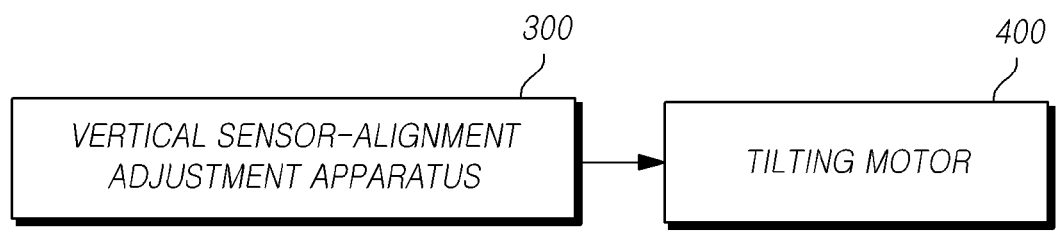
FIG. 4 shows a sensor with a vertical alignment adjustment function according to a tilting motor control method in accordance with an embodiment of the present invention.

Meanwhile, a method for correcting the vertical misalignment may be executed by using one of a antenna switching method (see FIG. 3) and a tilting motor control method (see FIG. 4).

In order to correct the vertical misalignment through transmitting antenna switching in the antenna switching method, the sensor 100 should include a plurality of transmitting antennas which are differently set in terms of transmitting angle for sensor signals, wherein the sensor 100 should also include a switch which can execute switching to a transmitting antenna set to an transmitting angle required for adjusting the vertical misalignment among the transmitting antennas.

In order to correct the vertical misalignment through receiving antenna switching in the antenna switching method, the sensor 100 should include a plurality of receiving antennas which are differently set in terms of receiving angle for reflected waves for the sensor signals, wherein the sensor 100 should also include a switch which can execute switching to a receiving antenna set to a receiving angle required for adjusting the vertical misalignment among the receiving antennas.

In order to correct the vertical misalignment through the tilting motor control, it is necessary that the angle of the sensor 100 per se can be controlled by a tilting motor, or one of the transmitting antennas included in the sensor 100 can be controlled by the tilting motor in terms of the transmitting angle (directed angle) for transmitting sensor signals.

FIGS. 3a and 3b show sensors 100 having a function for adjusting vertical alignment through an antenna switching method in accordance with an embodiment of the present invention, respectively.

Description will be separately made for a sensor 100 having a construction in which transmitting antennas are variably switched, and for a sensor 100 having a construction in which receiving antennas are variably switched with reference to FIGS. 3a and 3b.

FIG. 3a shows a sensor 100 having a construction in which transmitting antennas can be variably switched so as to adjust the transmitting angle of sensor signals, and transmitting and receiving antenna beam regions according to the construction.

Referring to FIG. 3a, the sensor 100 having a vertical sensor-alignment adjustment function according to antenna switching in accordance with an embodiment of the present invention includes a plurality of transmitting antennas Tx1, Tx2, . . . , and TxM: 310, which are differently set in terms of transmitting angle for transmitting sensor signals, a switch 320 for selecting a transmitting antenna set to an transmitting angle most adjacent to a desired transmitting angle among the transmitting antennas Tx1, Tx2, . . . , and TxM: 310, so that the sensor signals can be transmitted at the desired transmitting angle, and a plurality of receiving antennas Rx1, Rx2, . . . , and RxN: 320 for receiving reflected waves for the sensor signals transmitted through the transmitting antenna selected by the switch 320.

Referring to the beam regions shown in the right side of FIG. 3a, the receiving antennas Rx1, Rx2, . . . , and RxN: 330 are set to have receiving angles which correspond to the differently set transmitting angles of the transmitting antennas Tx1, Tx2, . . . , and TxM: 310, respectively. As a result, the receiving antennas Rx1, Rx2, . . . , and RxN: 330 are capable of covering all of the transmitting angles which can be selected through the transmitting antennas Tx1, Tx2, . . . , and TxM: 310.

As shown in FIG. 3a, the beam region of the receiving antennas is a single beam region which can cover all of the beam regions of the transmitting antennas variably selected by the switch 320.

Referring to FIG. 3a, the sensor 100 having a vertical sensor-alignment adjustment function according to an antenna switching method in accordance with an embodiment of the present invention may further include an apparatus for adjusting vertical sensor alignment 300 (the apparatus may be referred to as vertical sensor-alignment adjustment apparatus below) which measures the signal intensity of reflected waves for sensor signals reflected by one or both of an object and the ground and received by the receiving antennas, and determines whether the sensor 100 is vertically misaligned or not on the basis of the measured signal intensity and a reference signal intensity, wherein when it is determined that the sensor 100 is vertically misaligned, the vertical sensor-alignment adjustment apparatus 300 calculates the misaligned angle of the sensor so as to adjust the vertical misalignment of the sensor 100, and determines a desired transmitting angle of the sensor for correcting the misaligned angle.

The desired transmitting angle determined by the vertical sensor-alignment adjustment apparatus 300 is used by the switch 320 for selecting one of the transmitting antennas Tx1, Tx2, . . . , and TxM: 310.

FIG. 3b shows a sensor 100 having a construction in which a plurality of receiving antennas can be variably switched so as to adjust the receiving angle of reflected waves for sensor signals, and transmitting and receiving antenna beam regions according to the construction.

Referring to FIG. 3b, the sensor 100 having a vertical sensor-alignment adjustment function according to a antenna switching method in accordance with an embodiment of the present invention includes a plurality of transmitting antennas Tx1, Tx2, . . . , and TxM: 310 for transmitting sensor signals, a plurality of receiving antennas Rx1, Rx2, . . . , and RxN: 330 which are differently set in terms of receiving angle, a switch 320 for selecting a receiving antenna set to a receiving angle corresponding to a predetermined transmitting angle for the sensor signals among the receiving antennas Rx1, Rx2, . . . , and RxN: 330, so that the reflected waves for the sensor signals transmitted at the predetermined transmitting angle from one of the transmitting antennas Tx1, Tx2, . . . , and TxM: 310 can be received by the selected receiving antenna.

Referring to the beam regions shown in the right side of FIG. 3b, the transmitting antennas Tx1, Tx2, . . . , and TxM: 310 are set to have transmitting angles which correspond to the differently set receiving angles of the receiving antennas Rx1, Rx2, . . . , and RxN: 330, respectively. That is, the receiving antenna beam region is a form enclosing all of the individual receiving antenna beam regions. As a result, even if the transmitting antennas Tx1, Tx2, . . . , and TxM: 310 transmit sensor signals at any transmitting angle, it is possible to select a receiving antenna set to a receiving angle corresponding to the transmitting angle, so that the reflected waves for the transmitted sensor signals can be received.

As shown in FIG. 3b, the beam region of the transmitting antennas is a single beam region which can cover all of the beam regions of the receiving antennas variably selected by the switch 320.

Referring to FIG. 3b, the sensor 100 having a vertical alignment adjustment function according to a antenna switching method in accordance with an embodiment of the present invention may further include a vertical sensor-alignment adjustment apparatus 300 which measures the signal intensity of reflected waves for sensor signals reflected by one or both of an object and the ground and received by the receiving antennas, and determines whether the sensor 100 is vertically misaligned or not on the basis of the measured signal intensity and a reference signal intensity, wherein when it is determined that the sensor 100 is vertically misaligned, the vertical sensor-alignment adjustment apparatus 300 renders the switch 320 to select a receiving antenna set to a receiving angle most adjacent to a predetermined transmitting angle among the receiving antennas Rx1, Rx2, . . . , and RxN: 330 so as to correct the vertical misalignment of the sensor 100.

FIG. 4 shows a sensor 100 having a vertical alignment adjustment function according to a tilting motor control method in accordance with another embodiment of the present invention.

Referring to FIG. 4, the sensor 100 having a vertical alignment adjustment function according to a tilting motor control method in accordance with another embodiment of the present invention includes: a vertical sensor-alignment adjustment apparatus 300 which measures the signal intensity for reflected waves for sensor signals reflected by one or both of an object or the ground and received by the receiving antennas, determines whether the sensor 100 is misaligned or not on the basis of the signal intensity of the measured reflected waves and a reference signal intensity, wherein when it is determined that the sensor 100 is vertically misaligned, the vertical sensor-alignment adjustment apparatus 300 calculates the misaligned angle of the sensor so as to adjust the vertical misalignment of the sensor 100, and determines a desired transmitting angle of the sensor for correcting the misaligned angle; and a tilting motor 400 for adjusting the sensor 100 per se or the transmitting angle of a transmitting antenna included in the sensor 100 on the basis of the desired transmitting angle determined by the vertical sensor-alignment adjustment apparatus 300.

Figure 5:
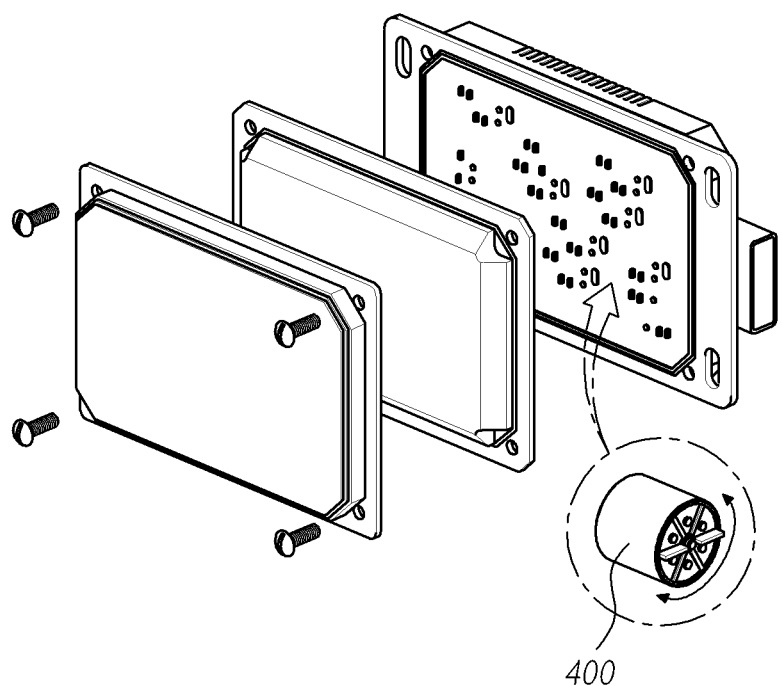
FIG. 5 shows a sensor having a tilting motor in accordance with another embodiment of the present invention.

The sensor 100 having a vertical alignment adjustment function according to the tilting motor control method in accordance with the above-mentioned embodiment can be implemented in a form including a tilting motor 400 as shown in FIG. 5.

Below, the vertical sensor-alignment adjustment apparatus which determines and corrects the vertical alignment of the sensor 100 by measuring the signal intensity of ground-reflected waves for the sensor signals reflected by the ground will be described in detail with reference to FIGS. 6 to 8. In addition, the vertical sensor-alignment adjustment apparatus which determines and corrects the vertical alignment of the sensor 100 by measuring the signal intensity of reflected waves for the sensor signals reflected by an object will be described in detail with reference to FIGS. 9 to 11. Moreover, the vertical sensor-alignment adjustment apparatus which determines and corrects the vertical alignment of the sensor 100 by measuring the vertical inclination of the sensor 100 will be described in detail with reference to FIG. 12.

Figure 6:
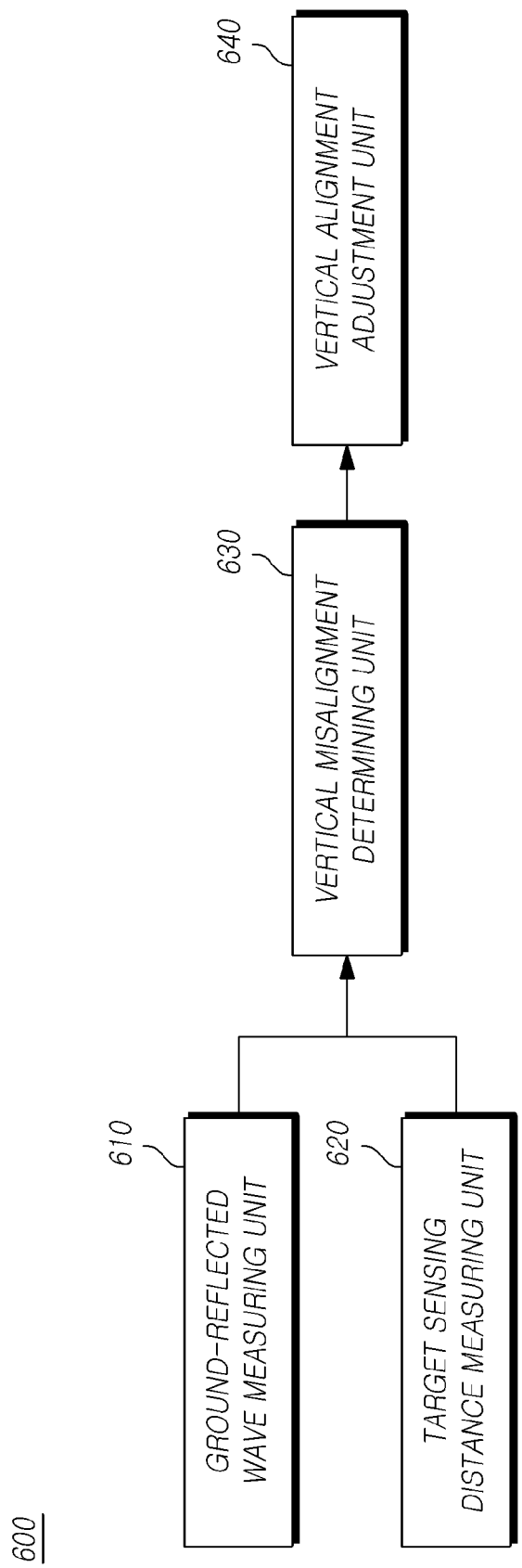
FIG. 6 shows a block diagram for an apparatus for adjusting vertical sensor-alignment.

FIG. 6 is a block diagram for an apparatus for adjusting vertical sensor-alignment 600 (the apparatus may be referred to as vertical sensor-alignment adjustment apparatus below) in accordance with an embodiment of the present invention.

Referring to FIG. 6, the vertical sensor-alignment adjustment apparatus 600 includes: a ground-reflected wave measuring unit 610 for measuring the signal intensity of ground-reflected waves on the basis of received reflected waves for sensor signals transmitted from the sensor 100; a target sensing distance measuring unit 620 for measuring the longest target-sensible distance as a target sensing distance on the basis of the received reflected waves; a vertical misalignment determining unit 630 which determines that the sensor 100 is vertically misaligned when the signal intensity of the ground-reflected waves measured by the ground-reflected wave measuring unit 610 exceeds a reference signal intensity, and the target sensing distance measured by the target sensing distance measuring unit 620 is reduced beyond a reference target sensing distance; and a vertical alignment adjustment unit 640 for correcting the vertical misalignment of the sensor 100 by controlling a tilting motor 400, executing switching to one of a plurality of transmitting antennas Tx1, Tx2, . . . , and TxM: 310 which are differently set in terms of transmitting angle, or executing switching to one of a plurality of receiving antennas Tx1, Tx2, . . . , and TxM: 310 which are differently set in terms of receiving angle.

Figure 7:
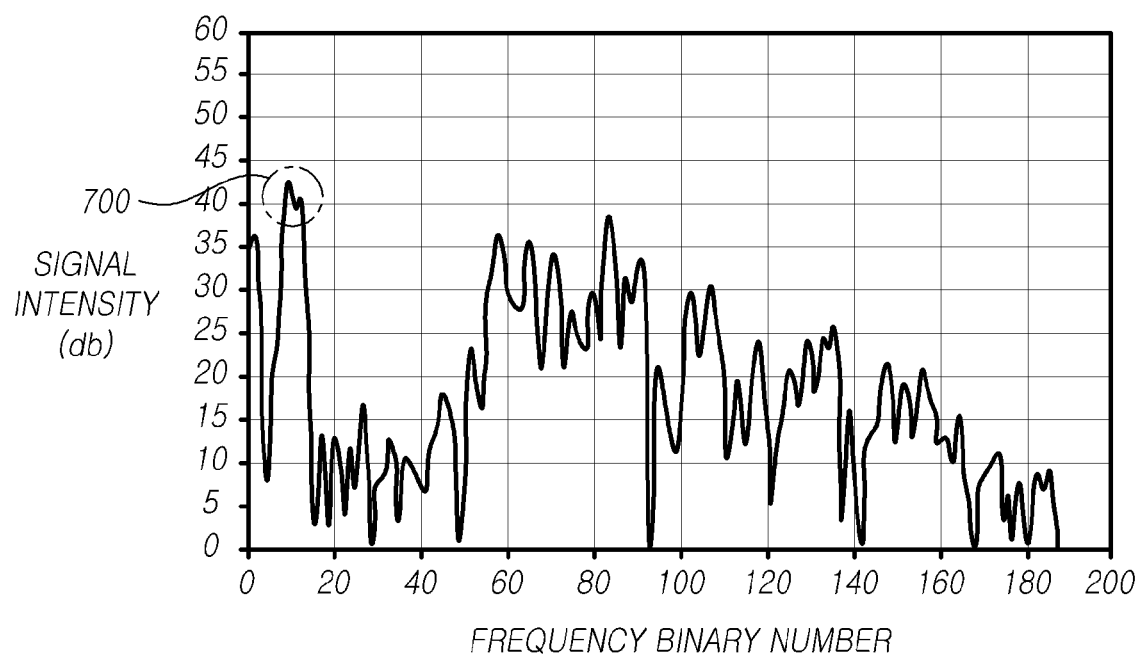
FIG. 7 is a view for describing a method for measuring ground-reflected waves with an apparatus for adjusting vertical sensor-alignment in accordance with an embodiment of the present invention.

The ground-reflected wave measuring unit 610 senses received reflected waves for transmitted sensor signals, and, if reflected waves exceeding a predetermined signal intensity at a certain frequency area as indicated by 700 in FIG. 7 are sensed for a predetermined length of time as a result of such sensing, the ground-reflected wave measuring unit 610 determines the reflected waves sensed in this condition as ground-reflected waves, and measures the signal intensity of the determined ground-reflected waves.

The above-mentioned reference signal intensity is one of information items serving as a basis for determining whether the sensor is vertically misaligned or not by being compared to the signal intensity of the ground-reflected waves, wherein in an ideal case in which the sensor 100 is vertically aligned correctly, the reference signal intensity will be zero. In addition, in a non-ideal actual environment, it is possible to define the reference signal intensity as a predetermined value or a predetermined range of values.

The vertical alignment adjustment unit 640 calculates a misaligned angle in terms of the vertical alignment of the sensor on the basis of the measured signal intensity of ground-reflected waves, the reference signal intensity, the measured target sensing distance, and the reference target sensing distance, and corrects the vertical misalignment of the sensor 100, on the basis of the calculated misaligned angle, by controlling the tilting motor 400, by executing switching to one of the transmitting antennas Tx1, Tx2, . . . , and TxM: 310 which are differently set in terms of transmitting angle, or by executing switching to one of the receiving antennas Rx1, Rx2, . . . , and RxN: 330 which are differently set in terms of receiving angle. As a result of such correction, the signal intensity of the ground-reflected waves will become equal to or lower than the reference signal, and the target sensing distance will not be reduced beyond the reference target sensing distance.

Figure 8:
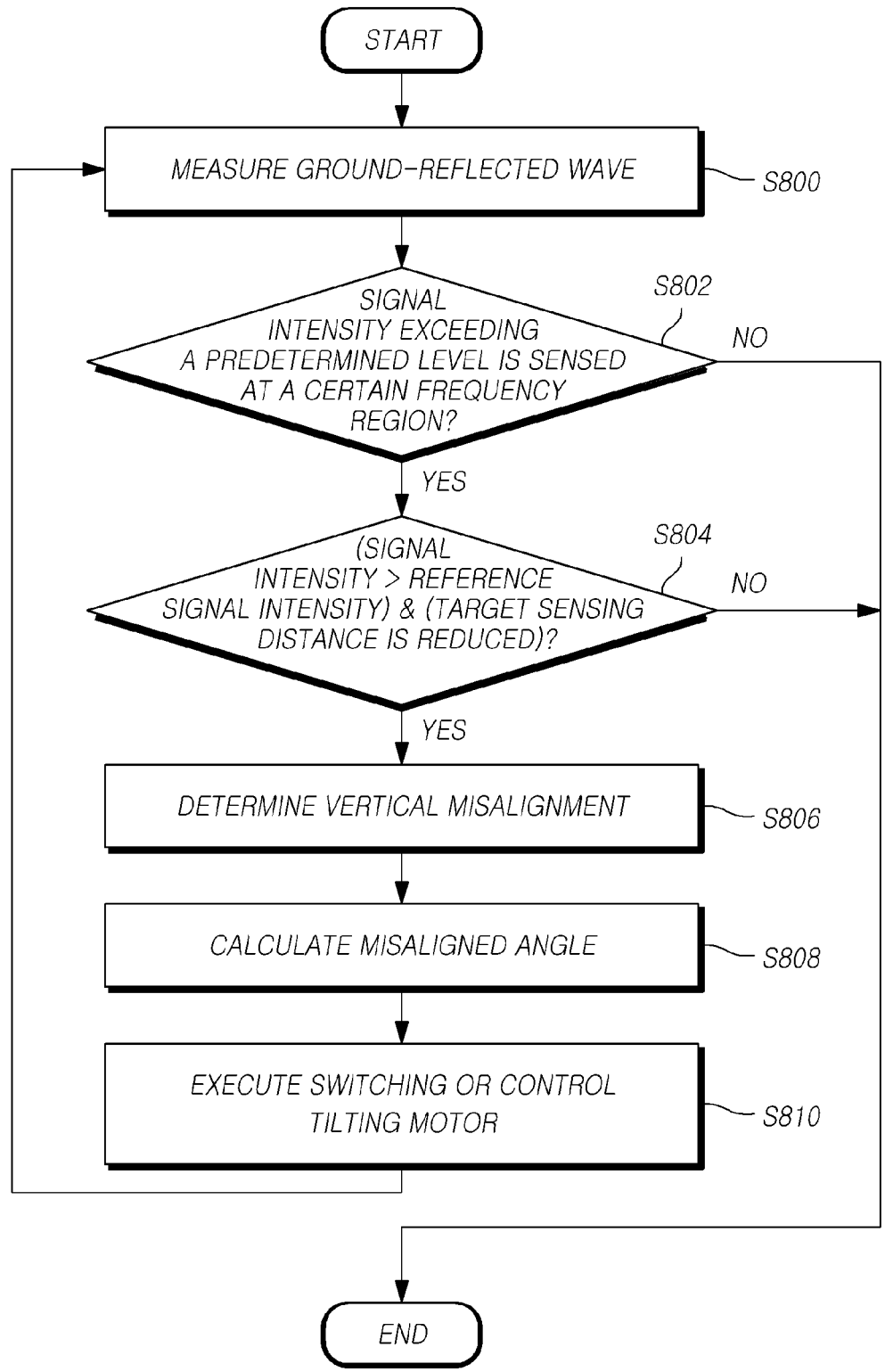
FIG. 8 is a flowchart for a method of adjusting vertical sensor-alignment in accordance with an embodiment of the present invention.

FIG. 8 is a flow chart for a method of adjusting vertical sensor-alignment provided by a vertical sensor-alignment adjustment apparatus 600 in accordance with an embodiment of the present invention described with reference to FIG. 6. The method of adjusting vertical sensor-alignment will be described below with reference to FIG. 8.

Referring to FIG. 8, ground-reflected waves at a predetermined frequency area are measured on the basis of received reflected waves for sensor signals transmitted from the sensor 100 (S800), it is determined whether ground-reflected waves with a signal intensity equal to or higher than a predetermined level at a certain frequency area are sensed for a predetermined length of time (S802). As a result of such determination, if it is determined that the ground-reflected waves with a signal intensity equal to or higher than the predetermined level at the certain frequency area are not sensed for the predetermined length of time, the adjustment of vertical sensor-alignment is terminated, and if it is determined that the ground-reflected waves with a signal intensity equal to or higher than the predetermined level at the certain frequency area are sensed for the predetermined length of time, it is determined whether the signal intensity of the ground-reflected waves sensed for the predetermined length of time with a signal intensity equal to or higher than the predetermined level at the certain frequency area exceeds a reference signal intensity (a threshold value), and whether the target sensing distance measured on the basis of the received reflected waves (the longest target-sensible distance) is reduced beyond the reference target sensing distance (S804).

Referring to FIG. 8, as a result of such determination, if it is determined that the signal intensity of the ground-reflected waves exceeds the reference signal intensity (the threshold value), and the target sensing distance measured on the basis of the received reflected waves (the longest target-sensible distance) is reduced beyond the reference target sensing distance, it is determined that the sensor 100 is vertically misaligned (S806), and the misaligned angle for the vertical alignment of the sensor 100 is calculated on the basis of the measured signal intensity of the ground-reflected waves, the reference signal intensity, the measured target sensing distance, and the reference target sensing distance (S808).

Referring to FIG. 8, on the basis of the calculated misaligned angle, the step of controlling the tilting motor 400, the step of switching to one of the transmitting antennas Tx1, Tx2, . . . and TxM: 310, which are differently set in terms of transmitting angle, or the step of switching to one of the receiving antennas Rx1, Rx2, . . . , and RxN: 330, which are differently set in terms of receiving angle, is executed (S810), and then the above-mentioned steps are repeated again from the step 800 until the vertical misalignment of the sensor 100 is corrected and thus the vertical alignment adjustment is terminated, that is until the ground-reflected waves having a signal intensity equal to or higher than the predetermined signal intensity at the certain frequency area are not sensed as the step S802 is performed, or the signal intensity of the ground-reflected waves becomes equal to or lower than the reference intensity as the step S804 is performed.

Figure 9:
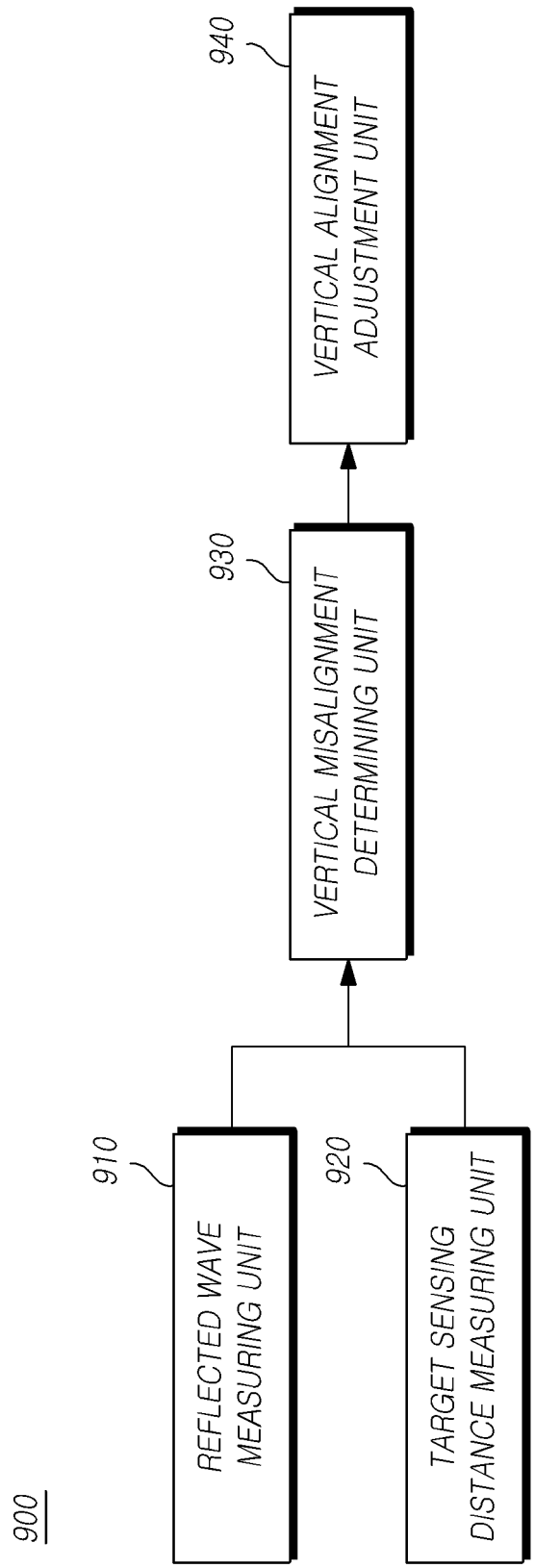
FIG. 9 is a block diagram of an apparatus for adjusting vertical sensor-alignment in accordance with an embodiment of the present invention.

FIG. 9 is a block diagram for an apparatus for adjusting vertical sensor-alignment 900 (the apparatus may be referred to as vertical sensor-alignment apparatus below) in accordance with another embodiment of the present invention.

Referring to FIG. 9, the vertical sensor-alignment adjustment apparatus 900 includes: a reflected wave measuring unit 910 for measuring the signal intensity of reflected waves on the basis of received reflected waves for sensor signals transmitted from the sensor 100 and reflected by an object; a vertical misalignment determining unit 930 which determines that the sensor 100 is vertically misaligned if the measured signal intensity of the reflected waves is lower than the reference signal intensity; and a vertical alignment adjustment unit 940 for correcting the vertical misalignment of the sensor 100 by controlling a tilting motor 400, executing switching to one of a plurality of transmitting antennas Tx1, Tx2, . . . , and TxM: 310 which are differently set in terms of transmitting angle, or executing switching to one of a plurality of receiving antennas Tx1, Tx2, . . . , and TxM: 310 which are differently set in terms of receiving angle.

By way of an example, the signal intensity of the reflected waves measured by the reflected wave measuring unit 910 as described above may be a mean signal intensity value (mean power value) for the reflected waves reflected by one or more stationary objects fixed on a road while a vehicle is being driven. For example, it is possible to obtain reflected waves of a predetermined mean value incident from stationary objects (guard rails, street trees or the like) if a vehicle is being driven on a road for a predetermined length of time (for example, for ten (10) minutes) as shown in FIG. 10*a*. As shown in FIG. 10*b*, although the vehicle may roll depending on the driving condition of the vehicle when the vehicle is driven on a country road, a highway and an urban road, it is possible to calculate a mean signal intensity value of reflected waves reflected from one or more objects. At this time, if the mean signal intensity value (mean power value) of reflected waves is lower than a predetermined reference signal intensity (threshold value), it may be determined that the vehicle is in a situation in which the sensor 100 is distorted upwardly or downwardly. If so, the vertical misalignment may be repeatedly corrected through a antenna switching method (transmitting antenna switching or receiving antenna switching) or a tilting motor control method until the signal intensity of reflected waves for a transmitting antenna beam (number 1 or 2 transmitting antenna beam in FIG. 2) becomes equal to or higher than the reference signal intensity.

Referring to FIG. 9, the vertical sensor-alignment adjustment apparatus 900 in accordance with the present embodiment may further include a target sensing distance measuring unit 920 for measuring the longest target-sensible distance as a target sensing distance on the basis of received reflected waves.

When the vertical sensor-alignment adjustment apparatus 900 further includes the target sensing distance measuring unit 920, the vertical misalignment determining unit 930 determines that the sensor 100 is misaligned downwardly in terms of its vertical alignment if the measured signal intensity of the reflected waves is lower than the reference signal intensity, and the measured target sensing distance is reduced beyond the reference target sensing distance. If so, the vertical alignment adjustment unit 940 calculates the downwardly misaligned angle for the vertical alignment of the sensor 100 on the basis of the measured signal intensity of the reflected waves, the reference signal intensity, the measured target sensing distance, and the reference target sensing distance, and on the basis of the calculated downwardly misaligned angle, the vertical alignment adjustment unit 940 corrects the vertical misalignment of the sensor 100 by controlling the tilting motor in the upward direction, by executing switching to one of the transmitting antennas Tx1, Tx2, . . . , and TxM: 310 which are differently set in terms of transmitting angle, or by executing switching to one of the receiving antennas Rx1, Rx2, . . . , and RxN: 330 which are differently set in terms of receiving angle until the signal intensity of the reflected waves becomes equal to or higher than reference signal intensity. As a result of such vertical misalignment correction, the signal intensity of the reflected waves becomes equal to or higher than the reference signal intensity.

In addition, if the measured signal intensity of reflected waves is lower than the reference signal intensity, and the measured target sensing distance is not reduced beyond the reference target sensing distance, the vertical misalignment determining unit 930 determines that the sensor 100 is misaligned upwardly in terms of its vertical alignment. If so, the vertical alignment adjustment unit 940 calculates the upwardly misaligned angle for the vertical alignment of the sensor 100 on the basis of the measured signal intensity of reflected waves, the reference signal intensity, the measured target sensing distance, and the reference target sensing distance, and on the basis of the calculated upwardly misaligned angle, the vertical alignment adjustment unit 940 corrects the vertical misalignment of the sensor 100 by controlling the tilting motor in the downward direction, by executing switching to one of the transmitting antennas Tx1, Tx2, . . . , and TxM: 310 which are differently set in terms of transmitting angle, or by executing switching to one of the receiving antennas Rx1, Rx2, . . . , and RxN: 330 until the signal intensity of the reflected waves becomes equal to or higher than reference signal intensity. As a result of such vertical misalignment correction, the signal intensity of the reflected waves becomes equal to or higher than the reference signal intensity.

FIG. 11 is a flow chart for a method of adjusting vertical sensor-alignment provided by the vertical sensor-alignment adjustment apparatus 900 in accordance with the embodiment of the present invention described with reference to FIG. 9. The method of adjusting vertical sensor-alignment will be described below with reference to FIG. 11.

Referring to FIG. 11, the signal intensity of received reflected waves at a predetermined frequency area is measured for sensor signals transmitted from the sensor 100 and reflected by an object (S1100), and it is determined whether the signal intensity of the measured reflected waves is lower than a reference signal intensity or not (S1102). As a result of such determination, if it is determined that the measured signal intensity of the reflected waves is lower than the reference signal intensity, it is determined that the sensor 100 is vertically misaligned, and hence it is considered that the sensor 100 is in a situation in which vertical alignment adjustment is required. Then, the longest target-sensible distance is measured as a target sensing distance on the basis of the received reflected waves, and if the measured target sensing distance is reduced beyond the reference target sensing distance, it is determined that the sensor 100 is misaligned downwardly in terms of its vertical alignment (S1108), and if the measured target sensing distance is not reduced beyond the reference target sensing distance, it is determined that the sensor 100 is misaligned upwardly in terms of its vertical alignment (S1106). Then, a misaligned angle is calculated as to how the sensor 110 is misaligned downwardly or upwardly in terms of its vertical alignment (S1110). Then, on the basis of the calculated misaligned angle, the step of controlling the tilting motor in the upward or downward direction, the step of switching to one of the transmitting antennas Tx1, Tx2, . . . , TxM: 310) which are differently set in terms of transmitting angle or the step of switching to one of the receiving antennas Rx1, Rx2, . . . , RxN: 330) which are differently set in terms of receiving angle, is executed (S1112), and the above-mentioned process is returned to the step S1100 so as to confirm whether the vertical misalignment is corrected or not. If it is confirmed that the vertical misalignment is corrected, the process is terminated, and if it is confirmed that the vertical misalignment is not corrected yet, the above-mentioned process is repeated until the correction is completed.

FIG. 12 is a block diagram for an apparatus for adjusting vertical sensor-alignment 1200 (the apparatus may be referred to as vertical sensor-alignment adjustment apparatus below) in accordance with another embodiment of the present invention.

Referring to FIG. 12, the vertical sensor-alignment adjustment apparatus 1200 includes: a vertical inclination measuring unit 1210 for measuring the vertical inclination of a sensor 100 with reference to the ground with an acceleration sensor (the sensor may be referred to as G (Gravity) sensor); a vertical misalignment determining unit 1230 which determines that the sensor 100 is vertically misaligned when the difference between the measured vertical inclination of the sensor and the vertical inclination of the ground is positioned out of a predetermined range; and a vertical alignment adjustment unit 1240, wherein when it is determined that the difference between the measured vertical inclination of the sensor and the vertical inclination of the ground is positioned out of a predetermined range, the vertical alignment adjustment corrects the vertical misalignment of the sensor 100 by controlling a tilting motor 400, by executing switching to one of the transmitting antennas Tx1, Tx2, . . . , and TxM: 310 which are differently set in terms of transmitting angle, or by executing switching to one of the receiving antennas Rx1, Rx2, . . . , and RxN: 330, so that the difference between the measured vertical inclination of the sensor and the vertical inclination of the ground is positioned within the predetermined range.

The above-mentioned ground may be a horizontal surface (a surface perpendicular to the weight direction) or an inclined surface with a predetermined angle, and hence the vertical inclination of the ground may be an inclination having a zero degree or a predetermined angle in relation to the weight direction.

In accordance with the present invention, the vertical alignment adjustment function for correcting vertical misalignment of the sensor 100 means a function for adjusting the transmitting angle of the sensor signals transmitted from the sensor 100, or adjusting the receiving angle for receiving reflected waves for the sensor signals transmitted from the sensor 100.

In addition, in accordance with the present invention, the sensor may be one of a radar sensor, an infrared sensor, and an ultrasonic sensor, and may include a tilting motor, a plurality of antennas, and a switch for switching the antennas.

As described above, according to the present invention, it is possible to automatically adjust the vertical alignment of a sensor mounted on a vehicle by sensing the positional change or directional distortion of the sensor when the sensor suffered from positional change or directional distortion due to a contact accident, bumper collision, superannuation or the like of the vehicle.

In addition, according to the present invention it is possible to automatically adjust the vertical alignment of a sensor mounted on a vehicle by determining whether it is required to adjust the vertical sensor-alignment or not, so that systems employing such a sensor can correctly perform the functions thereof, and eventually a driver can safely drive the vehicle.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although some preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An apparatus for adjusting vertical sensor-alignment, comprising:
   a reflected wave measuring unit for measuring the signal intensity of received reflected waves for sensor signals transmitted from a sensor;
   a vertical misalignment determining unit which determines that the sensor is vertically misaligned if the measured signal intensity of the reflected waves is lower than a reference signal intensity;
   a vertical alignment adjustment unit for automatically correcting the vertical misalignment of the sensor, in response to a determination by the vertical misalignment determining unit that vertical misalignment of the sensor occurs, by controlling a tilting motor, by executing switching to one of a plurality of transmitting antennas which are differently set in terms of transmitting angle, or by executing switching to one of a plurality of receiving antennas which are differently set in terms of receiving angle; and
   a target sensing distance measuring unit for measuring the longest target-sensible distance as a target sensing distance on the basis of the received reflected waves,
   wherein the reflected wave measuring unit measures signal intensity of ground-reflected waves on the basis of received reflected waves for sensor signals transmitted from the sensor, and
   wherein the misalignment determining unit determines that the sensor is vertically misaligned when the signal intensity of the ground-reflected waves measured by the reflected wave measuring unit exceeds a reference signal intensity, and the measured target sensing distance is reduced beyond a reference target sensing distance.

2. The apparatus as claimed in claim 1, wherein the reflected wave measuring unit senses received reflected waves for transmitted sensor signals, and as a result of such sensing, if reflected waves exceeding a predetermined signal intensity at a certain frequency area is sensed for a predetermined length of time, the reflected wave measuring unit determines the reflected waves senses in this condition as ground-reflected waves, and measures the signal intensity of the determined ground-reflected waves.

* * * * *